United States Patent [19]
Miller

[11] Patent Number: 5,506,984
[45] Date of Patent: Apr. 9, 1996

[54] METHOD AND SYSTEM FOR DATA RETRIEVAL IN A DISTRIBUTED SYSTEM USING LINKED LOCATION REFERENCES ON A PLURALITY OF NODES

[75] Inventor: James S. Miller, Arlington, Mass.

[73] Assignee: Digital Equipment Corporation, Maynard, Mass.

[21] Appl. No.: 86,441

[22] Filed: Jun. 30, 1993

[51] Int. Cl.$^6$ .................................................... G06F 17/30
[52] U.S. Cl. .................................... 395/600; 364/DIG. 1; 364/282.3; 364/282.4
[58] Field of Search .......................... 395/200.03, 200.09, 395/600

[56] References Cited

U.S. PATENT DOCUMENTS

| | | | |
|---|---|---|---|
| 4,914,571 | 4/1990 | Barata et al. | 395/200.09 |
| 5,270,701 | 12/1993 | Ito et al. | 340/825.03 |
| 5,341,477 | 8/1994 | Pitkin et al. | 395/200.03 |
| 5,345,586 | 9/1994 | Hamala et al. | 395/650 |
| 5,379,424 | 1/1995 | Morimoto et al. | 395/600 |
| 5,408,608 | 4/1995 | Ryu et al. | 395/200.03 |

*Primary Examiner*—Thomas G. Black
*Assistant Examiner*—John C. Loomis
*Attorney, Agent, or Firm*—Ronald C. Hudgens; Arthur W. Fisher

[57] ABSTRACT

A method and apparatus for virtual data integration in a database management system, specifically for providing multidatabase query and retrieval capability, where queries are generated at a user interface and passed to one of a plurality of databases. An organization engine (OE) is coupled to the user interface and, via an organization engine/database interface for each database, to the databases. The organization engine comprises a software module that passes a MakeCallBack routine along with the user query to the OE/database interface. The query is passed on to the database. If the queried data is not found at the queried database, but rather a reference to another database is found there, then that reference is passed back with a CallBack routine to the OE. The query is then redirected to the referenced database, and repeats the procedure until the sought data is actually located. The CallBack routine provides the OE with information for updating the information relating to this query, so that the next time the query is made, it is automatically routed to the correct database, i.e. the database actually holding the sought data. The modules implementing the invention may reside on a computer in addition to those storing the databases and those used by the user(s), or may reside on one of these latter computers. In a network of databases accessed by multiple users from remote locations, each user can then develop an updated index for all of the databases automatically, as queries are made.

6 Claims, 8 Drawing Sheets

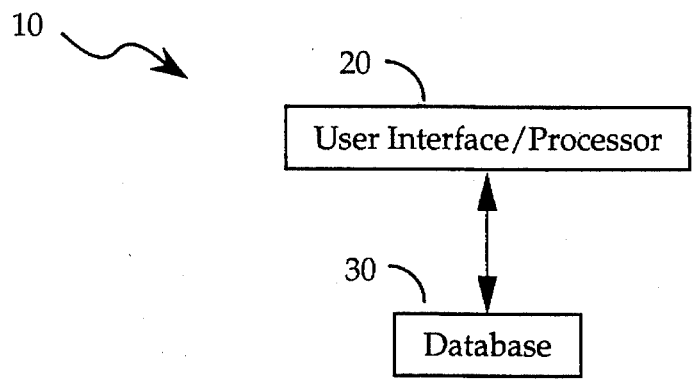
FIGURE 1–*Prior Art*
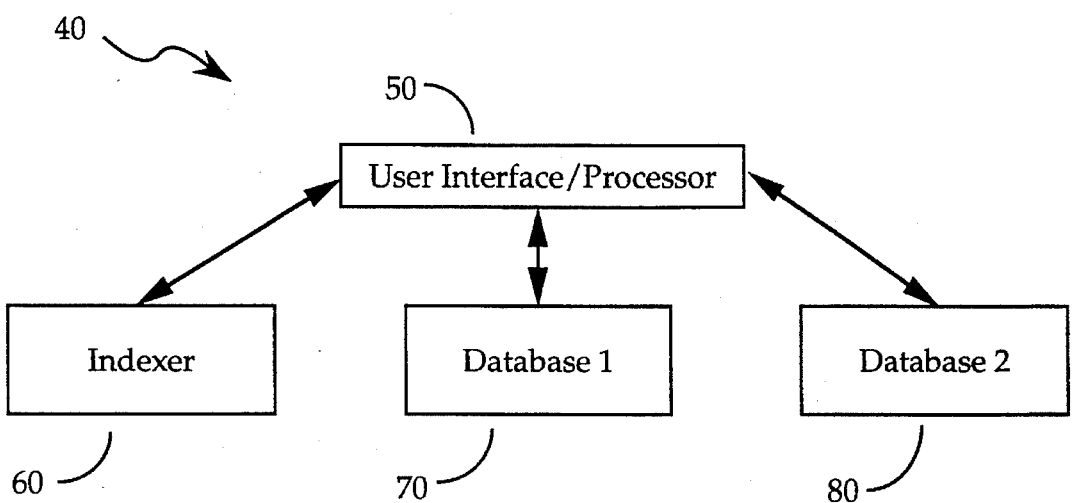
FIGURE 2–*Prior Art*

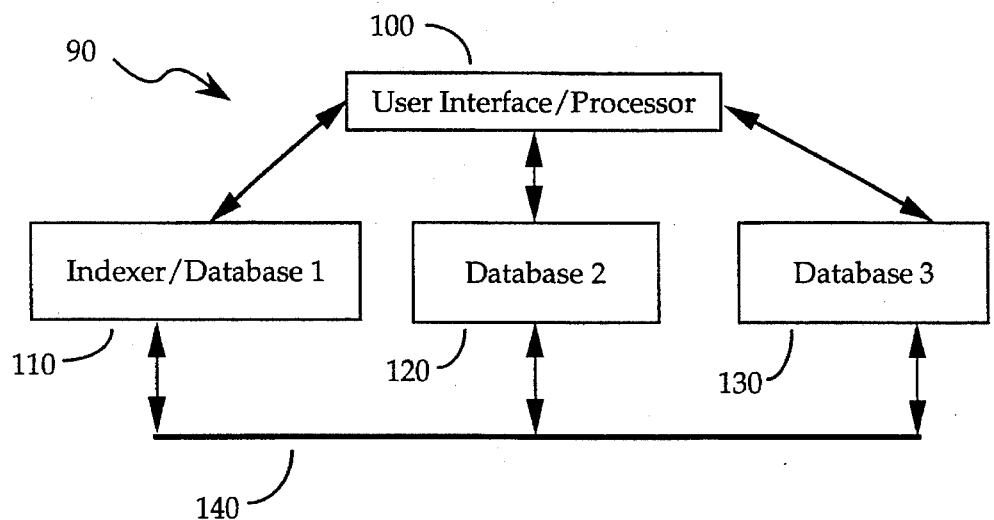
FIGURE 3–*Prior Art*
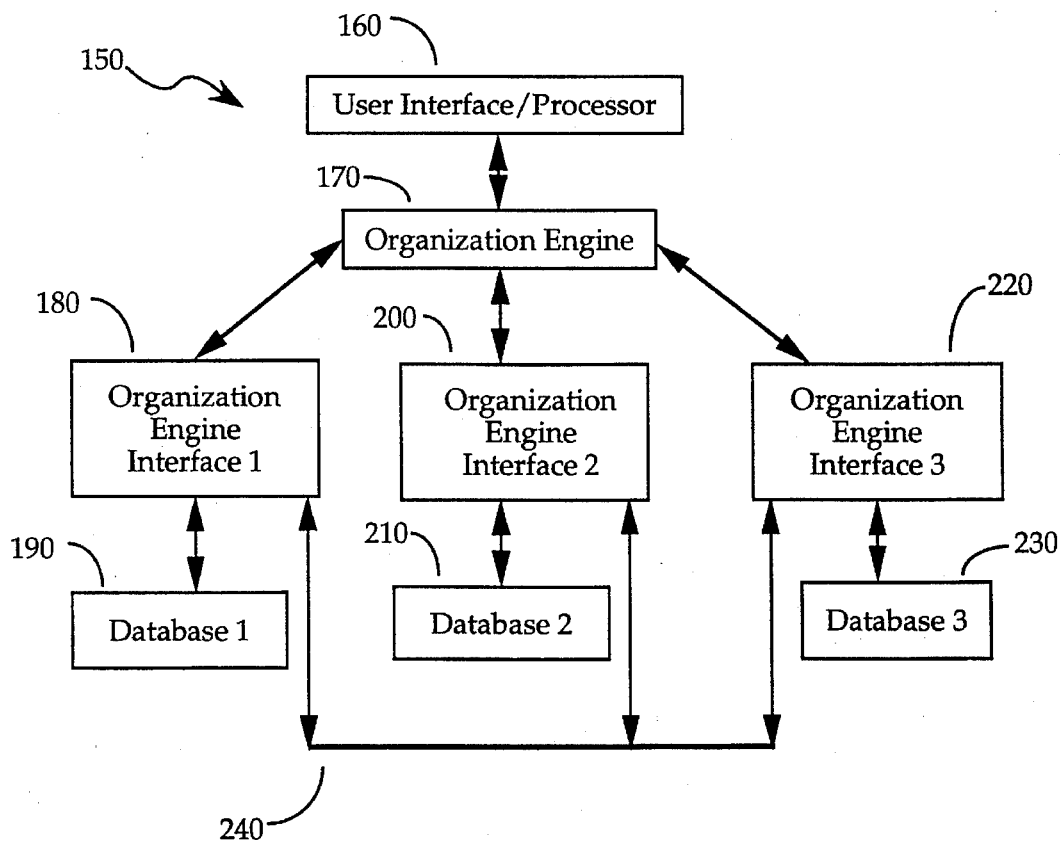
FIGURE 4

METHOD AND SYSTEM FOR DATA RETRIEVAL IN A DISTRIBUTED SYSTEM USING LINKED LOCATION REFERENCES ON A PLURALITY OF NODES

BACKGROUND OF THE INVENTION

This invention relates to information storage and management systems, and in particular to a multi-database information management system permitting the storage and retrieval of records located in a different information management system.

In a conventional information (or database) management system (IMS or DBMS), information is stored only internally to the system, so the system has access only to its own data. Such an IMS provides all of the mechanisms necessary to store, locate and retrieve the information in the databases under its control. For instance, in order to retrieve a record stored in one of the databases of the IMS, a user or a program will generate a query, asking for information which matches certain criteria. The IMS consults internal indexes and data structures to locate all matching data items. In addition, it schedules operations such as memory reads and writes, network access and disk activity, to actually retrieve the matching data items, and transmits the matching data back to the querying agent.

It is becoming more common to integrate IMS's, and a new level of information system has been developed, which may be referred to as an "index server" (or "service"). In order to provide access from a given IMS to another IMS, an index is created, which identifies where in the integrated system the requested information is stored; but the index does not store the information itself. An index server thus provides an organizational structure that can be used to locate and access all of the information stored anywhere in the integrated system, without duplicating the information itself, in a manner analogous to a library's card catalog or the index of a multivolume reference like an encyclopedia.

An index includes multiple "nodes", which are the index's entries. Each node contains a "key" and some contents. The key is the means by which the nodes of the index are sorted, e.g. alphabetically, chronologically, numerically, etc. Each node's contents may be a 'leaf', i.e. a reference to the location of a data record (analogous to a page number in a table of contents), or may even be a reference to another index, which itself includes nodes with different keys and contents. Thus, by accessing a node, a user may be led to the actual location of the desired data item, or may instead be led to another index which can provide that location. The chain of indexes may be any length.

A conventional, stand-alone IMS includes its own index, which may be made visible to the user, so that the references at the nodes can be directly viewed. A primary distinction between such an IMS and an index server is that the latter provides only data location capability, whereas an IMS is used both to store and to locate data. Such an IMS 10 is shown in FIG. 1, and includes a user interface/processor 20 and a database 30, which includes conventional cache memory and logic necessary for managing the information in the database. The database 30 includes an index.

The database 30 and interface/processor 20 may share a single processor, such as if the database resides in a given computer or workstation. On the other hand, it may be that the database 30 is in one computer, and the user interface/processor 20 in another.

The user interface/processor 20, as well as the other user interfaces discussed below, may include conventional devices (not separately shown) such as a keyboard, a mouse, and other input devices by which the user can enter data queries, as well as output devices such as a video display terminal (VDT) and a printer. Each such user interface/processor may in fact be any apparatus which can generate such queries, including a microprocessor running an application or a device which is event-driven to request data. In the latter cases, the "user" may be taken to mean the application or hardware generating the request, rather than a person.

An index server system 40 is shown in FIG. 2, and includes a user interface/processor 50, and indexer (or index server) 60 (which conventionally has its own database), a first database 70, and a second database 80. When a request is made to the indexer 60 for a data item which is contained in database I (70) or database 2 (80), the indexer provides the user interface 50 with the correct source (i.e. database) information. The user then reenters the request, using the correct database as the information source.

The indexer 60, databases 70 and 80 and user interface/processor 50 may reside on one to four computers; thus, it is possible to have two or more databases (and/or the indexer) associated with the same processor in any combination.

Examples of index systems currently in use are the WAIS and GOPHER servers available on Internet. A user sends an information query to such an index server, which then locates a server which can provide the information. However, the server does not provide the information itself; rather, the user must then post a new query to the identified information source to retrieve the actual information desired. (This is analogous to references retrieved manually from the *Reader's Guide to Periodical Literature*.)

It is possible to merge such IMS's and index servers to form an "information broker". An information broker has an index which can be viewed by the user, like a standard index server. However, instead of merely including identification of the source where a given data item can be retrieved, as with a standard index server, the information broker includes a reference or pointer directly to that data item, so that when a query for the information is received, the information broker retrieves the data itself and not merely information about its location. In this sense, the information broker acts like the IMS, since the data is actually provided to the user. Some hypertext systems perform in this manner, and are thus information brokers.

The index of an information broker includes nodes containing two items:

(1) identification of an information source storing the requested data item; and (2) a data identifier which is particular to that information source, and is used to actually access the data. (A node containing this information may be referred to as an "external reference leaf". A node may alternatively list other nodes, or include the data itself. In the latter case, it may be referred to as a "data leaf".)

The data identifier will be different for different information sources; for example, for a query-based information system, the data identifier will be a query, while for object-or record-based information systems, the data identifier is a unique identifier of the data item. The term "data identifier" or DID will be used herein to refer generally to any such identifier of a given information system. In, by way of example, a bibliographic reference such as "Sussman 1983, page 3", the wording "Sussman 1983" corresponds to the identification of the data source, while "page 3" corresponds roughly to the data identifier. (No direct analog to the query form of the data identifier exists in book form.)

An information broker system 90 is shown in FIG. 3, and is similar to the index server system 40 shown in FIG. 2, except that the indexer/database 1 (reference numeral 110) is coupled via a bus 140 to the databases 2 and 3 (designated 120 and 130), respectively. Thus, when a misdirected query is sent by the user interface/processor 100 to the indexer 110 (i.e. where the requested information is not contained in the indexer's database), the indexer is able-using the correct routing information-to retrieve the requested data and return it to the user interface/processor 100.

Thus, in use today are all of these systems: IMS's, index servers and information brokers. The IMS is stand-alone, and provides both references and actual access to requested data items; the index server provides source information about data items in multiple databases, but no direct access; and the information broker provides multiple-database direct information access in a hyperlink-like system. A system can further be constructed which includes multiple information brokers including references to one another. In such a system, a query to a first broker (e.g. a company's in-house library information database) may result in the discovery that the requested information can be accessed by propagating a query to a different information broker (such as a university's library system), which in turn actually retrieves the information by sending a query to a conventional IMS (e.g. a CD ROM driver including a CD ROM of Books In Print). Thus, the query posted by an employee on the company's in-house network leads first to its own library, then to the university library, and finally to the CD ROM driver.

If both the company's server and the university's server are information brokers, the company employee need post only a single query to retrieve the information. However, this circuitous route is inefficient, occupying resources and taking time to execute. It would be far preferable if the employee could directly post a query to the CD ROM driver; but he or she will typically have no idea where the information is located. Even the company's library information database does not know where the information is stored; it is not until the university's library is accessed that it is learned that the information is stored on a given CD ROM. In a standard system, this route will be followed every time that requested data is accessed by the user.

A similar inefficiency can take place in a local system. Thus, a data query which is sent to a first database may be unsuccessful. If that database is set up as an information broker, however, the query is propagated to a second information broker, which itself may include a reference to an IMS containing the requested data item. Thus, the user ultimately retrieves the data, but only after going through one or several other servers. There is no provision in current systems for eliminating this circuitous query path.

SUMMARY OF THE INVENTION

The present system provides a dynamic mechanism for increasing data retrieval efficiency by eliminating unnecessary intermediate transactions by information brokers and index servers, once an initial interaction determines the location of the requested data.

A system is thus provided which cross-references information by virtual data integration. It includes an index server (or "indexer"), preferably in the form of an information broker, which contains cross-references to data stored in information sources, to allow users to access data from any of the multiplicity of sources by sending requests only to the information broker. Upon receiving a data request, the retrieval engine of the information broker both retrieves the requested information from the correct information source (in the manner of an information broker), and reports back the data's location in that source. Thus, the requester is told where the information was actually located, and a mechanism is provided to automatically access the correct information source directly when that data is next needed.

This mechanism may take the form of a call-back procedure. An information request sends both the data query itself and the call-back procedure as input arguments to the retrieval engine. The call-back procedure, if called by the retrieval engine, will be passed the correct location of the data as an input argument. The call-back procedure is responsible for updating the originating source's local reference to the requested information. The next time that information is needed, the query will be propagated directly to the correct information source. In this way, only the first erroneously directed query is required to be redirected, since each subsequent query takes the corrected form.

BRIEF DESCRIPTION OF THE DRAWINGS

FIG. 1 is a block diagram of a conventional Information Management System.

FIG. 2 is a block diagram of a conventional system using an index server.

FIG. 3 is a block diagram of a conventional system using an information broker.

FIG. 4 is a block diagram of a system according to the present invention.

DESCRIPTION OF THE PREFERRED EMBODIMENTS

Figure 5:
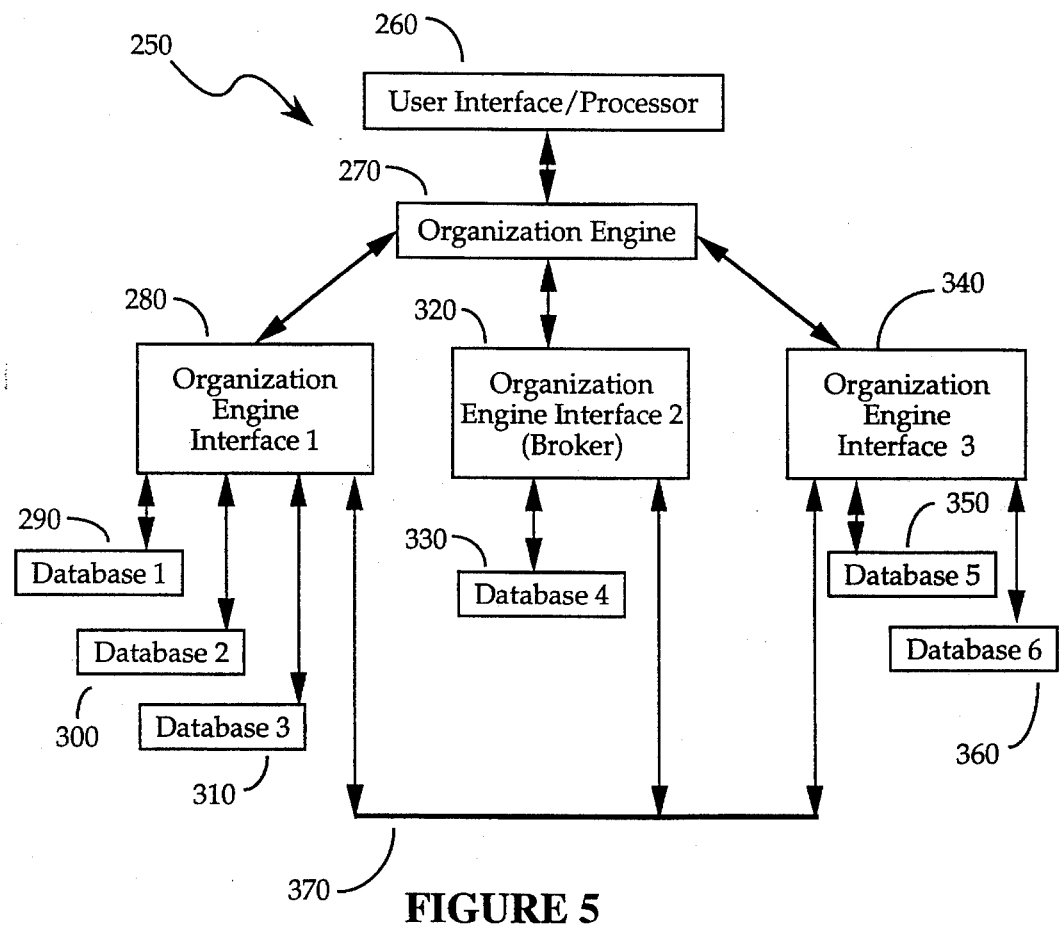
FIG. 5 is a block diagram of an extended system according to the present invention.

The following description first discusses hardware used in implementing the invention, and then describes the operation of the invention in terms of pseudocode. The procedures represented by the pseudocode are specific examples of how the general method of the invention can be practiced.

HARDWARE OF THE INVENTION

The present invention may be implemented in a system as shown in the block diagram of FIG. 4, which includes a conventional user interface/processor 160 coupled to an organization engine (OE) 170, whose function will be described in detail below. As with the prior art systems of FIGS. 1–3, the user interface/processor in each of the embodiments of the invention may comprise any input/output device, microprocessor or other apparatus, including necessary software, for propagating data queries to one or more databases.

The organization engine is coupled to three organization engine/database interfaces 180, 200 and 220, though any number may in principle be used. Each OE/database interface controls access to one database (190, 210 and 230, respectively), and the three interface are coupled to one another via the bus 240. These interfaces between the organization engine and the databases (and the others shown in FIGS. 5, 7 and 11, discussed below) include the software necessary to implement the specific protocols for each database. One such OE/database interface is needed for each type of database in the system.

In the embodiment of FIG. 4, each OE interface 180, 200 and 220 may act as an information broker, with conventional indexing and data retrieval capability as described above. Another possibility is to provide only one information broker, as in FIG. 5, wherein only interface 320 acts as an information broker. In this embodiment, databases 290, 300 and 310 (identified as databases 1–3 of this particular system) are all of the same type. Database 4 of this system (reference numeral 330) is of a different type, and databases 5 and 6 (reference numerals 350 and 360) are of a third type. Each of the OE interfaces 280, 320 and 340 controls the databases to which it is coupled in FIG. 5, and provides the proper interface between the organization engine 270 and the respective databases. The OE interfaces 280, 320 and 340 are coupled to one another via the bus 370. Any number of databases of the proper type may be grouped together for control by each organization engine/database interfaces 280, 320 or 340, and more or fewer database interfaces may be used.

The user interface/processor 260 in FIG. 5 may be of standard design, and preferably provides a graphical user interface with point-and-click capability for entry of user commands (such as select, open file, etc.).

Figure 6:
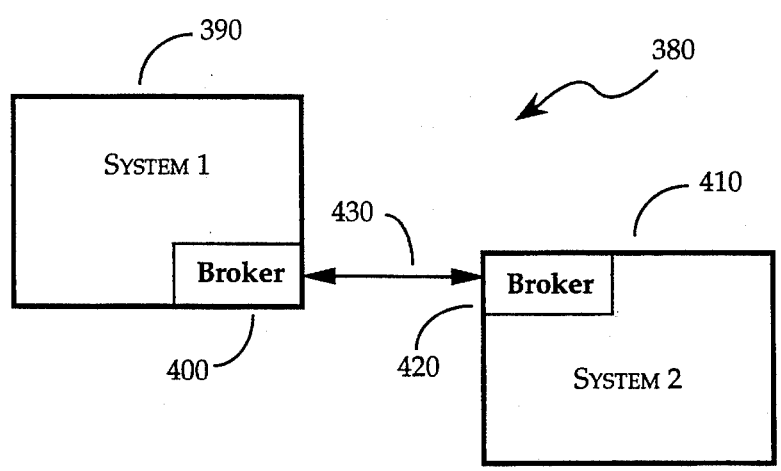
FIG. 6 is a block diagram of multiple, interconnected extended systems as in FIG. 5.

FIG. 6 shows a multi-system data management "supersystem" 380, where each of the systems 390 and 410 has a design similar to that of either system 150 of FIG. 4 or system 250 of FIG. 5. Data management system 390 includes at least one information broker 400, and data management system 410 includes at least one information broker 420, with the two information brokers 400 and 420 communicating via a bus 430.

Figure 9:
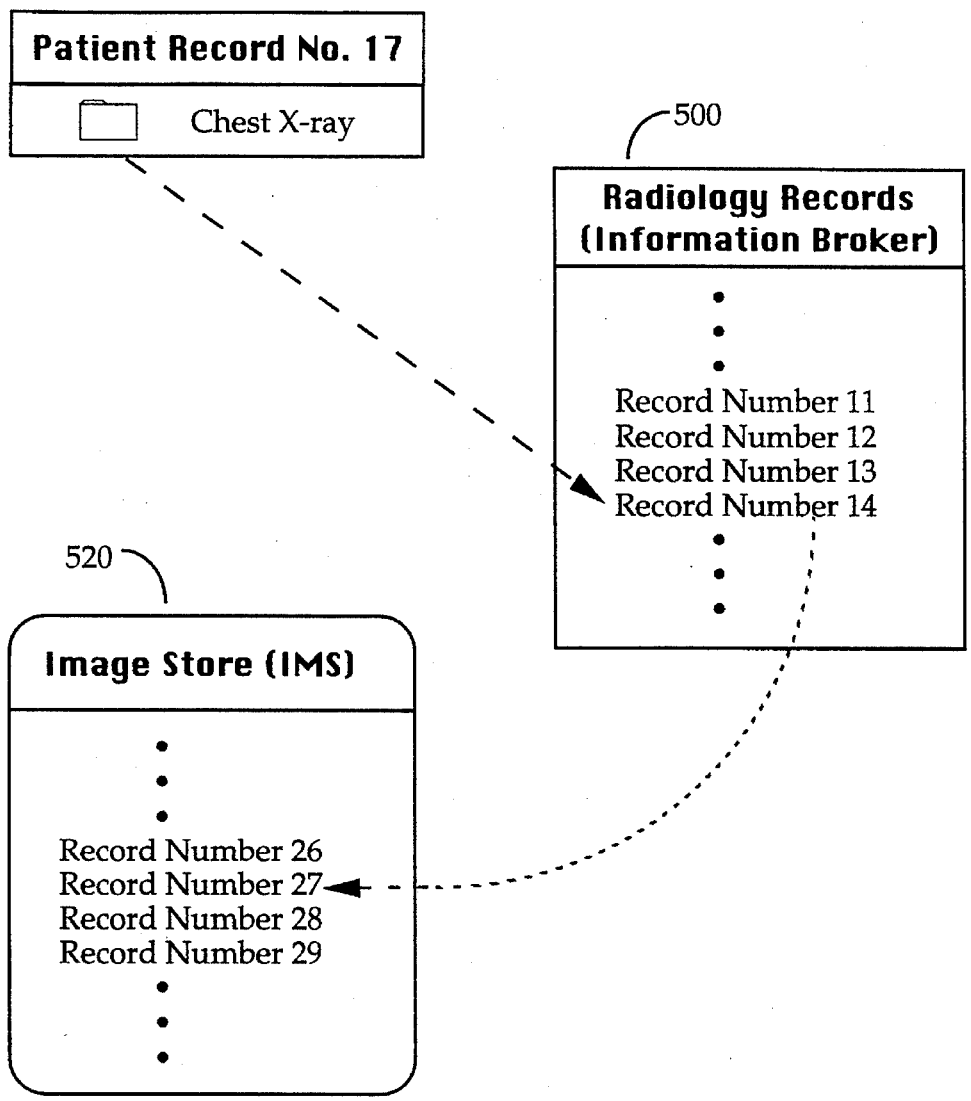
FIG. 9 is a diagram showing referencing among records of different databases used in the invention.
Figure 10:
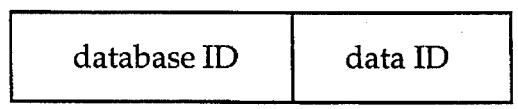
FIG. 10 is a diagram showing the data structure of an object ID passed between the organization engine of the invention and the user interface.
Figure 11:
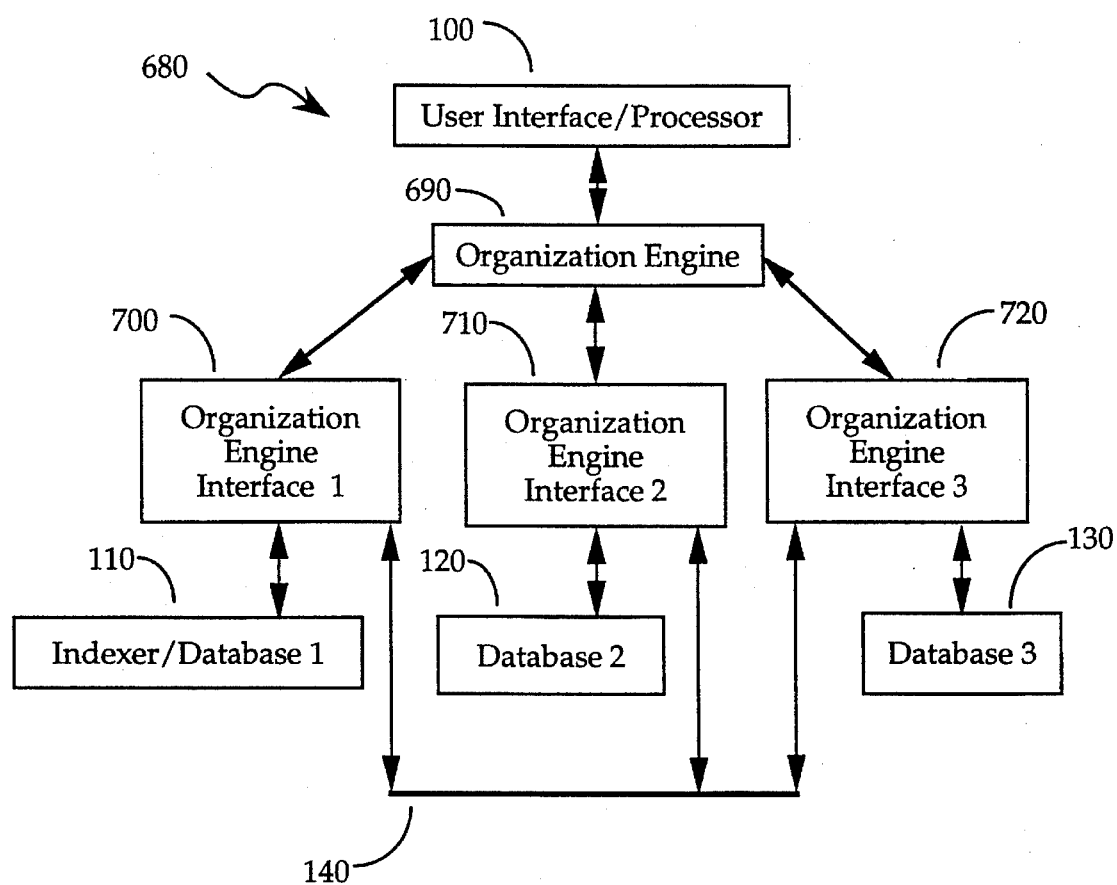
FIG. 11 is an exemplary modification of the system of FIG. 3 to incorporate features of the present invention.

Any of the designs of FIGS. 4–6 may be used to implement the present invention, whose basic operation will be described relative to FIGS. 7–10 and will be contrasted with the operation of the system shown in FIG. 3. FIG. 11 shows one embodiment of the invention achieved by modifying the apparatus of FIG. 3, and is discussed below.

The organization engine and OE/database interfaces depicted in each of FIGS. 4, 5, 7 and 11 may be implemented as logical software modules, and do not require any dedicated or special-purpose hardware. Thus, the databases are physically coupled to the user interface in each case, with the organization engine and OE/database interfaces providing the functions of the present invention by managing the data queries. It is alternatively possible to use one or more dedicated microprocessors including the necessary program logic to implement these functions, in which case the databases would be coupled to the user interface via such microprocessor(s). In this case, the organization engine and OE/database interfaces of the invention represent both hardware and software.

Figure 7:
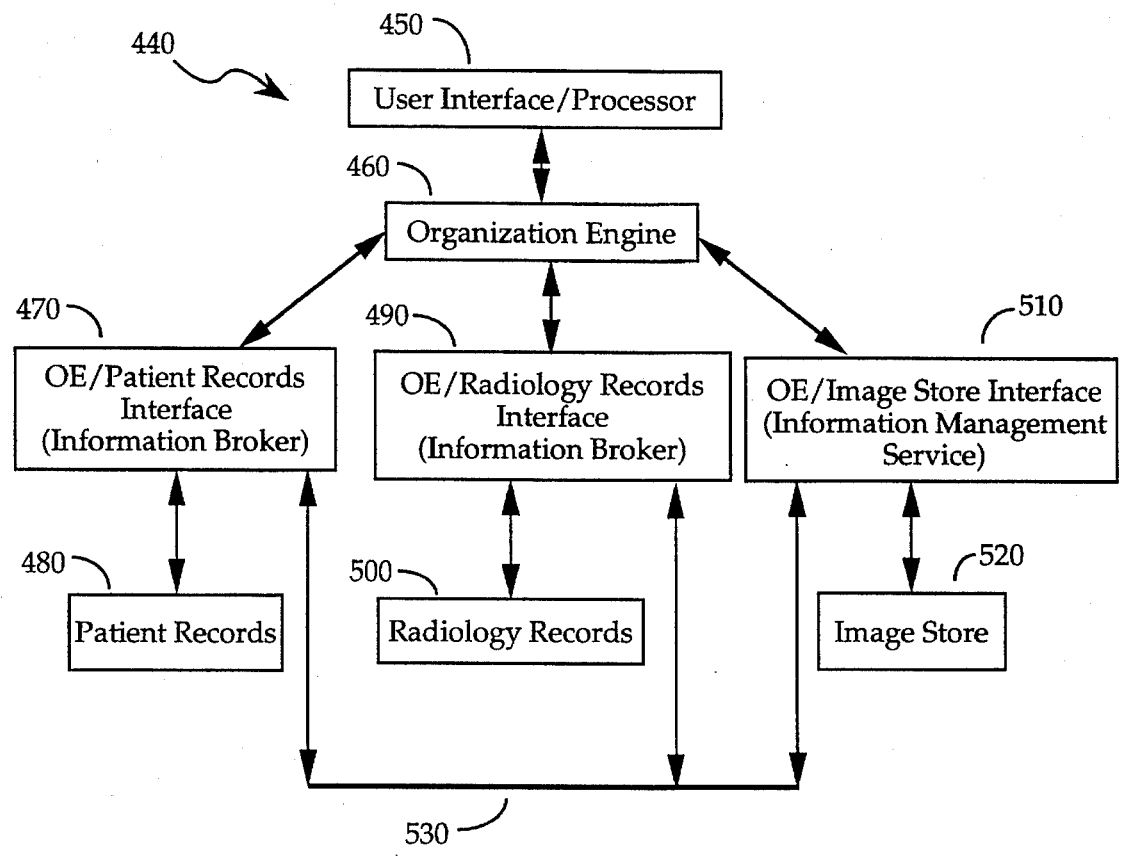
FIG. 7 is an example of a particular application of the invention.

FIG. 7 shows a data management system 440 which might be used, by way of example, to access patient records in a hospital, and includes three databases. A conventional user interface/processor 450 is used, coupled to an organization engine 460 according to the invention.

The interface/processor 450 is coupled to the organization engine 460, which may be implemented as software run on a conventional microprocessor. The engine 460 manages databases 480 (Patient Records), 500 (Radiology Records) and 520 (Image Store) via the respective interfaces 470, 490 and 510, which comprise software modules which, in one embodiment, run on separate microprocessors local to the respective databases. See discussion below of FIGS. 12 and 14. The interfaces 470, 490 and 510 are coupled to one another via bus 530.

Alternatively, the system may be organized such that a single processor is used to store the organization engine 460 and all of the interfaces 470, 490 and 510. See discussion below of FIGS. 13 and 15. In such an embodiment, the invention is well suited for implementation on existing hardware. A comparison of FIGS. 3 and 7 reveals that the invention can be implemented by adding new software layers to the system of FIG. 3, so that a previously existing system may be modified instead of replaced. The invention may thus be realized by a variety of combinations of existing hardware and new software.

Figure 12:
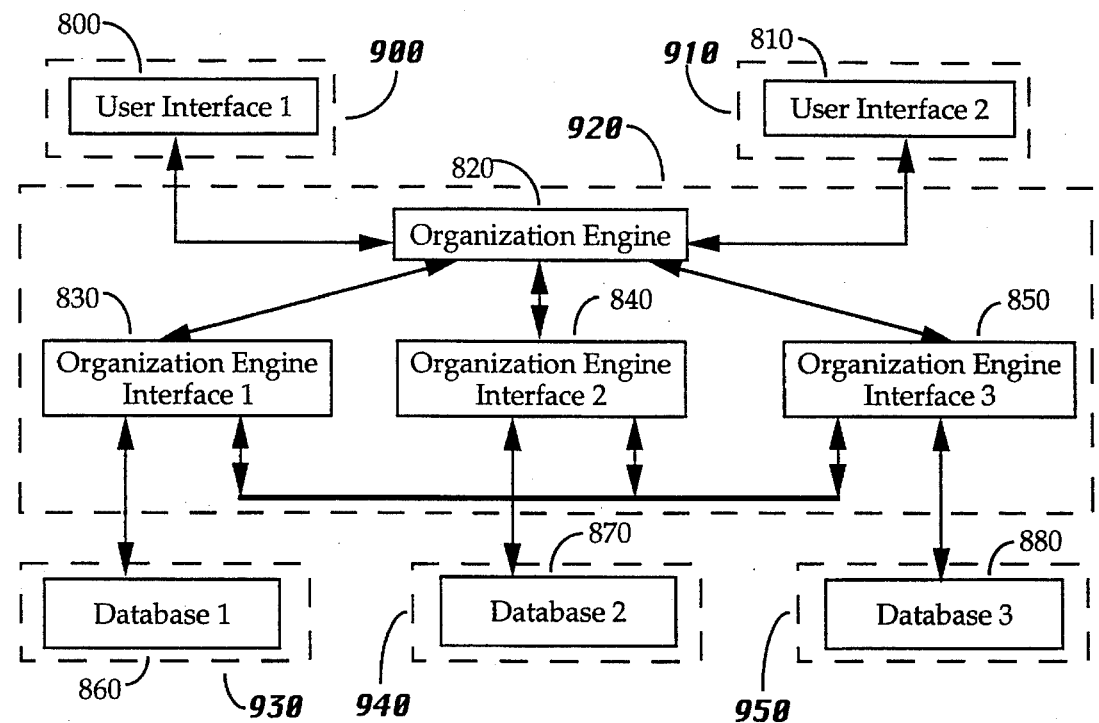
FIGS. 12–15 are embodiments showing various possible hardware configurations.
Figure 13:
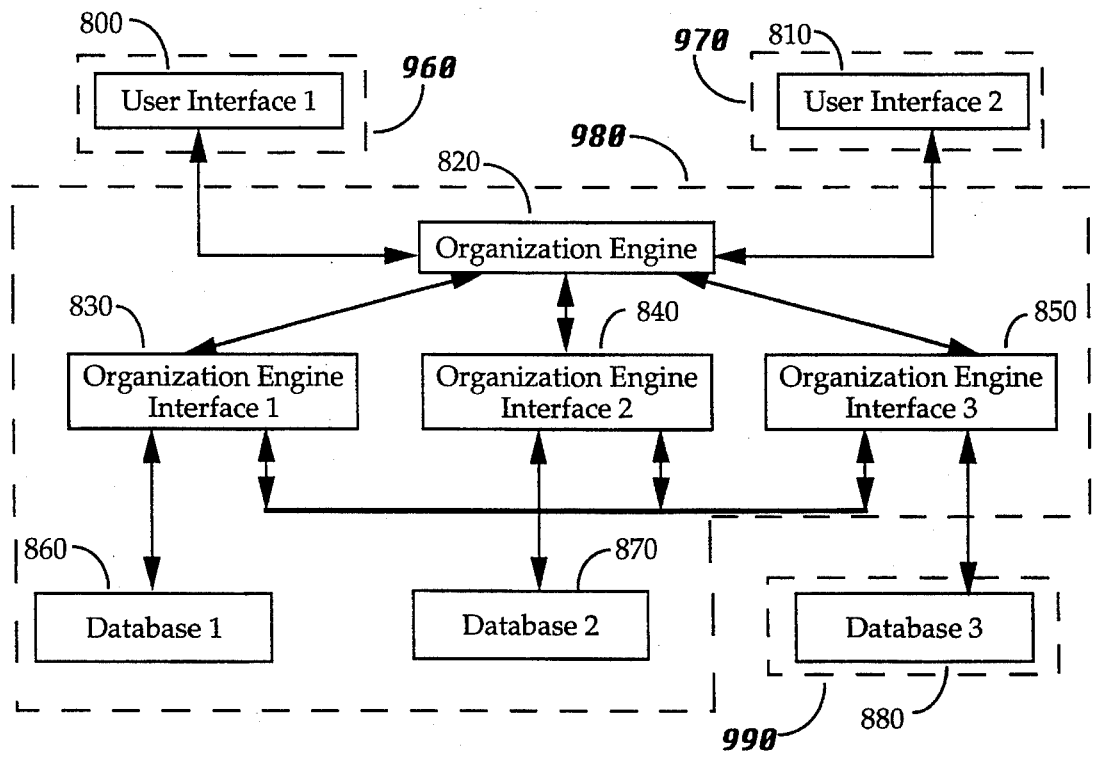

The flexibility of implementing the invention is demonstrated by reference to FIGS. 12–15. In FIGS. 12 and 13, the dotted lines denote separate computers. Thus, in the embodiment of FIG. 12 there are six computers: 900, 910, 920, 930, 940 and 950. Computers 930–950 may be pre-existing, conventional databases of any of the types discussed. Computers 900 and 910 include the user interfaces, and could be individuals' own workstations. Computer 920 in this case is a computer newly added to the system, between the workstations and the existing databases, and includes its own processor. The organization engine 820 and OE/database interfaces 830–850 are as described in detail below, and are implemented here as software modules running on computer 920. The interfaces 830–850 interact with the database access software of databases 860–880 to provide the features of the invention.

FIG. 13 shows another embodiment, wherein four computers 960, 970, 980 and 990 are used. The software modules for the organization engine 820 and the interfaces 830–850 in this configuration are stored in memory in computer 980, along with preexisting databases 860 and 870. The other database 880 resides in a separate computer 990, and the users each have their own computers 960 and 970.

Figure 14:
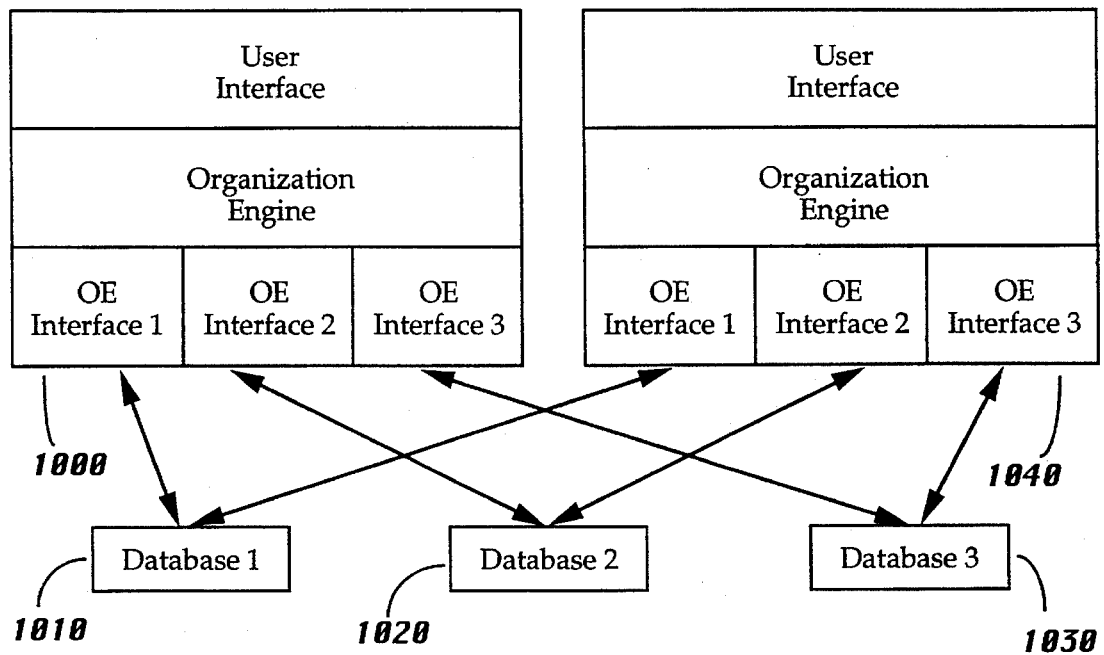

FIG. 14 shows another suitable configuration. Here, each user's computer 1000 and 1040 stores the organization engine and OE interface modules, identical for each of the two computers 1000 and 1040. The preexisting databases are one separate computers 1010, 1020 and 1030, and may be accessed, for instance, via a network or phone lines. The users of computers 1000 and 1040 needn't share any information, and each new user can make use of the features of the invention independently of others. No new hardware is set up in this case-just the software modules on the computers 1000 and 1040.

Figure 15:
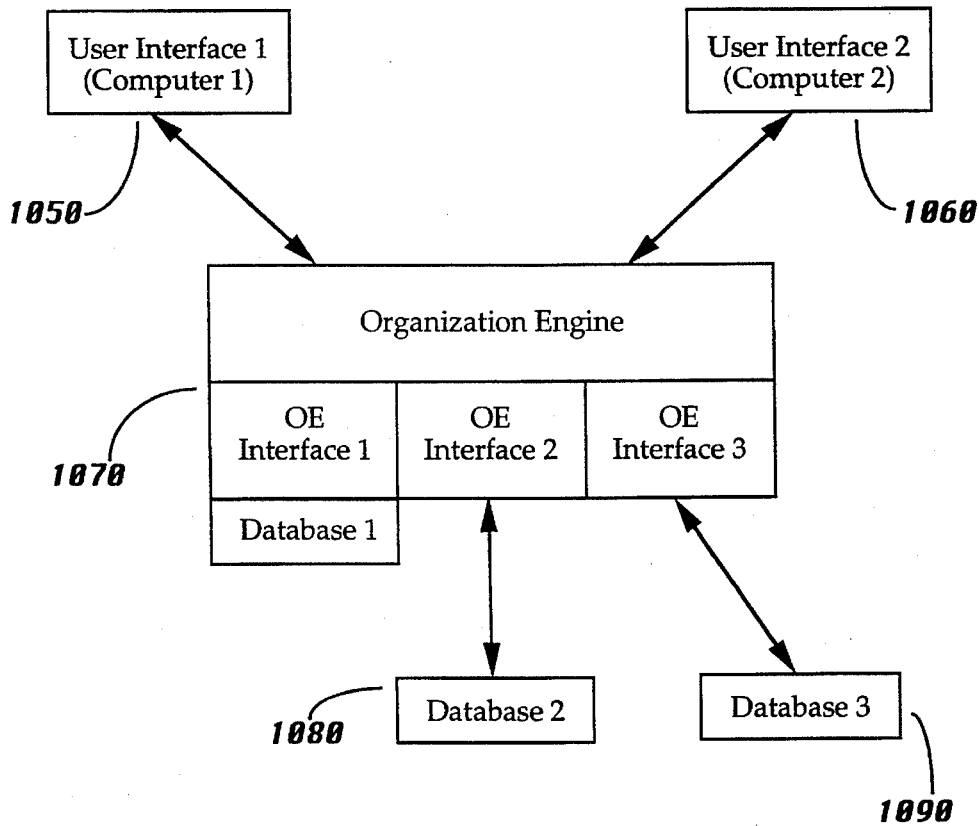

The same is true for the computers 1050 and 1060 in FIG. 15; database 1 in this case resides in a computer 1070 to which is added the software modules including the organization engine and OE interfaces 1, 2 and 3. Remote databases 2 and 3 reside on separate computers 1080 and 1090, and are not affected. The user interfaces 1 and 2 reside on computer 1 (1050) and computer 2 (1060), respectively.

Many variations are possible, because of the modular nature of the invention, as discussed in detail below.

Making a query

Figure 8:
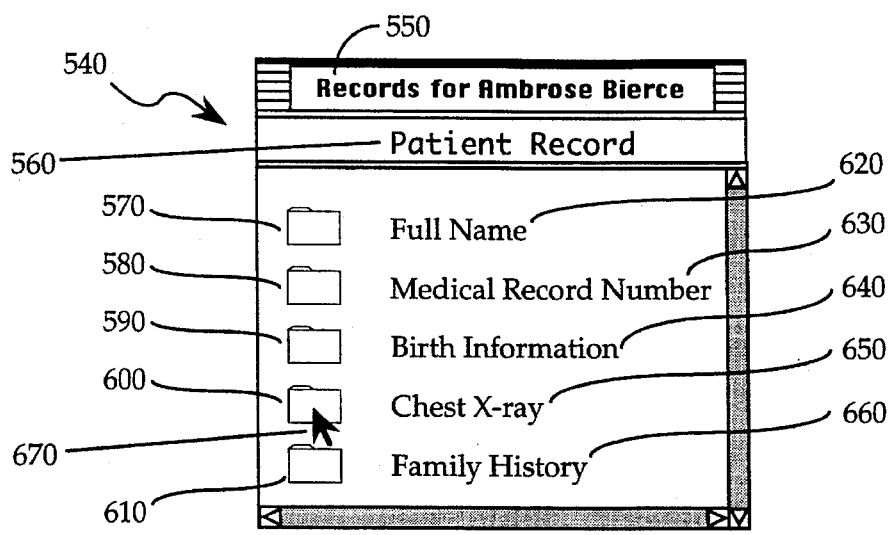
FIG. 8 is a representative screen display used in one embodiment of the invention.

In the hospital records example of FIGS. 7–10, when the user wishes to view data in connection with a particular patient, he or she retrieves and displays the data relative to that patient, such as the individual records represented by the patient records window 540 appearing in FIG. 8. The title 550 identifies the patient, and the heading 560 indicates that the information displayed in the window 540 is from the Patient Records database 480. Thus, before the user's query is generated, he or she already knows of the existence of the data item to be retrieved and has some indication of its location, or of a reference thereto.

The patient record includes several fields identified by the field names: Full Name (620), Medical Record Number (630), Birth Information (640), Chest X-ray (650), and Family History (660). Each field includes an associated icon, namely icons 570–610, respectively. If a user wants to access the information of a given field, he or she clicks on the appropriate icon using the cursor 670 and the mouse (not shown). (Of course, a text-based interface could also be used, with standard data retrieval commands.)

If the user wants to see the chest X-ray of the patient, he or she clicks on the icon 600. It will be assumed for this example that the field "Chest X-ray" contains not the actual X-ray image, but rather a reference to a database by which the image can be accessed. For example, the field "Chest X-ray" may be internally stored as record number 17 of Patient Records, and contain a reference to record number 14 of the Radiology Records database 500 (see FIGS. 7 and 9). (It is to be expected that patient records and radiology data would be stored in different databases, since they would normally be under control of different departments.) In the example, both the Patient Records database 480 and the Radiology Records database 500 are information brokers as described above.

It is also to be expected that Radiology Records may not contain actual X-ray images, but rather textual data relating to the patients. The actual images, which require large amounts of storage space, may be stored in a dedicated information management system (IMS), in this case one called Image Store, shown in FIG. 7 as database 520. Thus, record number 14 shown in FIG. 9 is also not the actual X-ray image desired by the user, but rather a reference to the image, which is stored as record number 27 in the image store IMS 520; that is, Radiology Records database 500 stores the information that its record 14 is in fact stored as record 27 in the Image Store database.

If the information brokers 470/480 and 490/500 and the IMS 510/520 shown in FIG. 7 were part of a system having the configuration of FIG. 3 (i.e. without the modifications according to this invention), a query by the user for the X-ray of the patient would proceed as follows. A click on icon 600 causes the user interface/processor 100 to generate a query for the X-ray, which is not found in Patient Records, so the query is propagated to the referenced record, namely record number 14 of the Radiology Records database. The Radiology Records database consults its internal tables, and finds that the desired record is actually stored in Image Store as record 27; it thus generates a further query to retrieve the image, and transmits the response back to the user interface.

When the querying user or another user wishes to call up the X-ray image again, he or she clicks on the icon 600 as before, and the same series of steps is followed. Thus, each time the image is to be displayed on the VDT, two incorrect queries are generated before the correct database is located, which is wasteful of processor and network time and make the user wait longer than necessary. If Patient Records and Radiology Records are merely index servers and not information brokers, then the user must not only wait for the correct record location to be discovered, but must himself generate the new queries at each step.

The Method of Virtual Data Integration

It will be seen that the present invention allows the system to "learn" where the information is stored, and use this to bypass the misdirected queries in all future requests. This is done by a mechanism to be invoked whenever the requested data does not reside in the information broker or indexer server which is originally queried by the user (or by an executing application).

The preferred embodiment of this mechanism is implemented as routines identified and discussed below as Make-CallBack and CallBack, and their associated definitions and routines, described in connection with pseudocode which reflects the method of the invention. In terms of this pseudocode, a query generated by the user interface 450 in this embodiment takes the form of the following call:

Retrieve(RadiologyRecords, 14, MakeCallBack(PatientRecords, 17, "Xray"))

This query directs the system to retrieve record 14 from the radiology records; the user, who merely clicked on the "Chest X-ray" folder icon, knows only that he/she is making a request for the X-ray image, and is unaware of where that image is actually stored. Thus, the above call is generated by that click on the folder icon. The MakeCallBack call is sent to RadiologyRecords by the Retrieve call, in case the data is not in actually stored in the radiology records database.

The Retrieve procedure resides in the organization engine 460, and may be defined as follows:

Procedure 1:

```
define Retrieve(DataSource, DataID, CallBack)
{   if (DataSource=RadiologyRecords)
       then return RetrieveRadiologyRecord(DataID, CallBack)
       else if (DataSource=ImageStore)
       then return RetrieveImageStore(DataID, CallBack)
       else . . .
       else error("Unknown data source", DataSource);
}
```

The RetrieveRadiologyRecord procedure, used by Retrieve, resides in the OE/radiology records interface 490, and is defined as follows:

Procedure 2:

```
define RetrieveRadiologyRecord(RecordIdentifier, CallBack)
{ (WhichDB, WhichRecord) = InternalLocate1
(RecordIdentifier);
    if (WhichDB=RadiologyRecord)
    { Contents = InternalRetrievel(RecordIdentifier);
       return Contents;
    }
```

Procedure 2:

```
    else
    { CallBack(WhichDB, WhichRecord);
        return Retrieve(WhichDB, WhichRecord, CallBack);
    }
}
```

The RetrieveImageStore procedure, also used by Retrieve, resides in the OE/image store interface 510, and is defined as follows:

Procedure 3:

```
define RetrieveImageStore(RecordIdentifier, CallBack)
{ (WhichDB, WhichRecord) = InternalLocate2
(RecordIdentifier);
    if (WhichDB=ImageStore)
    { Contents = InternalRetrieve2(RecordIdentifier);
        return Contents;
    }
    else
    { CallBack(WhichDB, WhichRecord);
        return Retrieve(WhichDB, WhichRecord, CallBack);
    }
}
```

The MakeCallBack arguments in the "Retrieve" call shown above reflect the fact that the query is for the contents of the field "Xray" in record 17 of the Patient Records data source. MakeCallBack resides in the organization engine 460, and is defined as follows:

Procedure 4:

```
define MakeCallBack(ReferencingDB,
                    ReferencingRecord,
                    ReferencingField)
{ define CallBack(CorrectDB, CorrectRecord)
    { UpdateIndexReference(ReferencingDB,
                    ReferencingRecord,
                    ReferencingField,
                    CorrectDB,
                    CorrectRecord);
    }
    return CallBack;
}
```

The UpdateIndexReference procedure is used by MakeCallBack, also resides in the organization engine 460, and is defined as follows:

Procedure 5:

```
define UpdateIndexReference(RefDB, RefRecord, RefField, DB,
                            Record)
{   if (RefDB=RadiologyRecords)
    then UpdateRadiologyRecordIndex(RefRecord, RefField,
    DB, Record)
    else if (RefDB=ImageStore)
    then UpdateImageStoreIndex(RefRecord, RefField, DB,
    Record)
    else . . .
    else error("Unknown data source", RefDB);
}
```

The UpdateRadiologyRecordIndex and UpdateImageStoreIndex procedures, used by UpdateIndexReference, are standard DBMS command routines for data retrieval, and may be defined generally as follows:

Procedure 6:

```
define UpdateRadiologyRecordIndex(RefRec, RefField, DB,
Record)
{ (code to locate record RefRec and update the contents of its
    field named RefField to contain a reference to record Record
    in data source DB)
}
```

Procedure 7:

```
define UpdateImageStoreIndex(RefRec, RefField, DB, Record)
{ (code to locate record RefRec and update the contents of its
    field named RefField to contain a reference to record Record
    in data source DB)
}
```

Procedure 6 preferably is part of the module forming interface 490 in FIG. 7. (It may or may not be stored in the same memory as the preexisting software controlling Radiology Records; compare database 2 in FIGS. 12 and 13, and see the foregoing discussion of these figures.)

Since Radiology Records is an information broker, it can retrieve other records from across the network and thus it is preferable for Procedure 6 to reside in database 500.

Procedure 7 may reside either in the image store database 520 or in the interface 510.

The procedures discussed here are all in the setting of a record-based system. They would take a different form in a query-based system (such as the widely used SQL system), but using the same functionality as described here, so their implementation in a query-based system is straightforward. The SQL system is described in C. J. and J. L. Hursch, "SQL: The Structured Query Language (Tab Books, Inc. 1988).

When the user clicks on icon 600 (in FIG. 8), the Organization engine generates a query to Patient Records, which in turn generates a Retrieve call to Radiology Records. When Retrieve is executed, the Radiology Records information broker is provided with a callback procedure created by MakeCallBack, which allows Radiology Records to update the Patient Records database with the correct information. In MakeCallBack, "ReferencingDB" refers to the Patient Records database, "ReferencingRecord" refers in this case to record 17 (see FIG. 9), and "ReferencingField" refers to the X-ray field.

If the Patient Records database itself included the actual image as the contents of the field "X-ray", then the procedure would simply retrieve the X-ray image and stop there. This will be the case at any database in the chain of databases which are queried for the data item.

The Retrieve call of the form "Retrieve(DataSource, DataID, CallBack)" (see Procedure 1) in this case is generated as noted above, namely as:

```
Retrieve(RadiologyRecords, 14,
        MakeCallBack(PatientRecords, 17, "Xray"))
```

Thus, in this example the data source is Radiology-Records (see Procedure 1, first "if" test), and Procedure 1 returns:

```
RetrieveRadiologyRecord (14,
        MakeCallBack(PatientRecords, 17, "Xray"))
```

Referring now to Procedure 2, this call in turn calls InternalLocate1 and determines by means of the RecordIdentifier (here, 14) that the record is actually stored in ImageStore. WhichDB is thus set to ImageStore, and WhichRecord is set to 27 (see FIG. 9).

InternalLocate1 and InternalRetrieve1 of Procedure 2, and InternalLocate2 and InternalRetrieve2 of Procedure 3, are not explicitly defined here, but may take the form of standard routines for locating and retrieving records as in conventional index servers and information brokers.

Since WhichDB is not RadiologyRecord, the two calls defined in RetrieveRadiologyRecord (Procedure 2) are executed, namely:

```
CallBack(ImageStore, 27);
return Retrieve(ImageStore, 27, CallBack);
```

CallBack is the procedure generated by MakeCallBack (Procedure 4), and is equivalent to the following procedure:

```
define CallBack(CorrectDB, CorrectRecord)
   { UpdateIndexReference(PatientRecords, 17, "XRay",
                          CorrectDB, CorrectRecord);
   }
```

CorrectDB and CorrectRecord are arguments supplied to CallBack if it is called by procedures 2 or 3. If the record is not located in the database making the call, then the database to which it makes reference is supplied as CorrectDB, and the record in which the data is to be found is supplied as CorrectRecord.

Procedure 5 defines how this is accomplished. Since the data item in question-the X-ray-is actually found in Image Store, the second "if" statement in Procedure 5 is true (i.e., RefDB=Image Store) and thus the following call is made:

```
UpdateIndexReference(PatientRecords, 17, "XRay", ImageStore,
27);
return Retrieve(ImageStore, 27):
```

That is, the correct database and correct record are properly identified as Image Store, record number 27 (see FIG. 9). The Retrieve call here actually retrieves the desired X-ray image.

The UpdateIndexReference call updates the contents of the Patient Records information broker. Accordingly, any subsequent reference to the X-ray or record 17 in Patient Records will immediately return the contents of Image Store, record 27, instead of going through the earlier, circuitous path via Radiology Records. Thus, the user is provided with the requested X-ray image almost as quickly as under prior systems. The execution of the UpdateIndexReference to modify the Patient Records information broker takes some time, of course, so that a misdirected query is not fulfilled quite as quickly as if this step were not carried out. It is, however, executed faster than in systems without an information broker, since in such systems the user must himself resend a modified query when the originally queried database does not contain the requested information.

However, users making later queries for the same information are provided with the X-ray image more quickly than under prior systems, both because the original reference in Patient Records is correct and there is one query fewer, and because the data is transmitted directly from Image Store to the user interface, rather than first to Radiology Records and only then to the user interface.

The above example shows the efficiency of the CallBack procedure in a multidatabase environment.

The system of FIG. 7 implements the above procedures in the following manner. Typically, a data query passed by the user interface 450 to the organization engine 460 involves passing an object identifier (or object ID) for the desired information, the object ID including a database ID and a data ID, as shown in FIG. 10. Along with the object ID, the name of the field from which the data query was made is passed, for later reference in case the CallBack routine should need to update the referencing database (here, the Patient Records).

The data ID in a record-based information system is referred to in standard terminology as the "record ID", and takes different forms for different types of databases. In a query-based information system (such as SQL), the data ID takes the form of a query. Generating the object ID is a straightforward matter, once it is known what type of information system must be accessed.

The organization engine 460 includes a procedure for extracting the data ID from the object ID. The database ID is used to access the correct database, such as the Radiology Records database 500 (see FIG. 7) in the above example. The data ID is then passed to the appropriate interface; in this example, that is initially the OE/Radiology Records interface 490.

The CallBack routine is resident in the organization engine 460, and is passed along with the data ID to the OE interface (such as interface 490). Thus, the interface 490/ database 500 uses the newly-generated callback procedure in retrieving the requested X-ray image from the Image Store database 520. If database 520 did not have the requested data, it would itself propagate the callback procedure to the database which it referenced, until finally the database actually storing the information would be reached. The last-generated callback contains the correct reference as to the database and record number of the requested information, and this reference is passed with the retrieved information back to the organization engine, which passes the information on to the user via the user interface and updates the original data source with the correct location of the requested information.

Updating of intermediate data sources

The above-described procedures, or their equivalents in either a record-based or query-based system, will succeed in updating the original referencing database, here the Patient Records. It is desirable also to update the intermediate databases in the chain to the actual data, in this case the Radiology Records database. MakeCallBack (Procedure 4) can be modified to do this. In the above example, MakeCallBack requires three arguments: the referencing database, the referencing record, and the referencing field. Since in the example the intermediate database-Radiology Records-does not have a field to be updated, both MakeCallBack and UpdateIndexReference should be modified so that the referencing field is not a required argument. This can be done by making the argument optional, with a call of the form

```
MakeBrokerCallBack(ReferencingDB, ReferencingRecord,
                   [ReferencingField])
``` or, to express it more simply, by rewriting the MakeCallBack and UpdateIndexReference procedures for use by any intermediate brokers, as follows:

```
Procedure 8:

define MakeBrokerCallBack(ReferencingDB,
                         ReferencingRecord)
{ define BrokerCallBack(CorrectDB, CorrectRecord)
    { UpdateBrokerIndexReference(ReferencingDB,
                                 ReferencingRecord,
                                 CorrectDB,
                                 CorrectRecord);
    }
    return BrokerCallBack;
}
Procedure 9:

define UpdateBrokerIndexReference(RefDB, RefRecord, DB,
Record)
{ if (RefDB=RadiologyRecords)
    then UpdateRadiologyRecordIndex(RefRecord, DB, Record)
    else if (RefDB=ImageStore)
    then UpdateImageStoreIndex(RefRecord, DB, Record)
    else . . .
    else error("Unknown data source", RefDB);
}
```

The above additional procedures will allow each of the databases in the chain or retrieval to update its records with the correct location of the requested data. From the first request on, whenever any of those databases is queried for the data item, the request will be routed directly to the correct data source.

Implementation in an object-oriented system

The method of the invention can also be implemented using object-oriented programming. In this case, there would not be a separate Retrieve function; rather, the data source would be represented as an object having a retrieve method or operation inherent in its definition.

The fundamental functionality of the system will be the same in an object-oriented setting, and given the above procedures, it is straightforward to apply the teaching herein to objects in such a setting. Whichever type of system is used, if the requested data item is not found in the queried location the system must provide alternate location information and means for updating the queried location to refer to the alternate location. The updated location is in any case returned along with the requested data item.

Modification of existing systems

The system of the invention can be applied in several different ways to existing database management systems. For instance, in an existing system several databases may be connected as in FIG. 3, wherein only one includes the indexing information. Such a system may be modified to include the organization engine 690 and interfaces 700, 710 and 720 of the present invention, as in FIG. 11.

In this modification, database 110 remains as the only indexer. In the resulting system, data queries to databases 120 and 130 will return only the information requested and misdirected queries are not accommodated, as before. However, the indexer/database 110 is provided with information about the contents of databases 120 and 130, as well as the callback capability. Thus, by using the callback procedure from the organization engine 690, the invention may be implemented with minimal modification of the existing system. This is important, since it keeps down the expense and effort necessary to achieve virtual data integration of large, interconnected database systems already in place.

The system of FIG. 3 could alternatively be modified to implement the invention by providing each database with the indexing and callback capabilities, as discussed above with respect to FIG. 4. This is ideal from a user's point of view, since every data query may be made locally, and the system automatically routes the queries, returns the requested information, and updates the local index for quicker retrieval upon subsequent queries. As new databases are installed, each should be provided with the callback and related capabilities, such that newly created or added databases will routinely include these functions.

Finally, the embodiments of FIGS. 12–15, discussed above, represent a variety of ways in which existing systems can be adapted to incorporate the present invention.

I claim:

1. A method of retrieving data from databases in a database management system having a processor, at least a first database, a second database and a third database, and a user interface coupled to the first, second and third databases, the method including the steps of:

(1) generating a first request by the user interface to the first database for retrieval of a data item having a reference in the first database;

(2) determining whether the data item is stored in the first database;

(3) if the determination in step 2 is positive, then retrieving the data item from the first database, returning it to the user interface, and ending the retrieval procedure;

(4) if the determination in step 2 is negative, then determining whether the first database's reference to the data item is a reference to a location in the second database;

(5) if the determination in step 4 is positive, then generating a second request to the second database for retrieval of the data item;

(6) determining whether the data item is stored at the referenced location in the second database;

(7) if the determination in step 6 is positive, then retrieving the data item from the second database, and returning it to the user interface;

(8) if the determination in step 6 is negative, then determining whether the referenced location in the second database includes a further reference to a location in the third database;

(9) if the determination of step 8 is positive, then generating a third request to the third database for retrieval of the data item;

(10) determining whether the data item is stored at the referenced location in the third database; and

(11) if the determination of step 10 is positive, then retrieving the data item from the third database, returning it to the user interface, and updating the first database's reference to the data item to include a reference to the location of the data item in the third database.

2. The method of claim 1, wherein said updating step includes passing a CallBack procedure call to said first database and executing said CallBack procedure at said first database so as to update said first database's reference to the data item to include a reference to the location of the data item in the third database.

3. The method of claim 1 to retrieve data from a set of databases that includes at least one additional database, wherein said method includes generating requests to a sequence of said databases to locate said data item until said data item is found in a last queried one of said databases;

step 11 further includes the step of updating references for the data item in intermediate ones of said databases, for which requests were generated after said first database and before a next to last queried one of said databases, to include a reference to the location of the data item in said last queried one of said databases.

4. A system for retrieving data from a first database, a second database and a third database, the first database including a first reference to a data item, the databases being coupled to a user interface having a processor, said system comprising:

generating means for generating a first data query to said first database, requesting retrieval of said data item;

retrieval means for determining whether said data item is in a given database, and if so, for retrieving said data item from said given database, the retrieval means including:

means for determining whether said data item is stored in said first database, and if so, for retrieving said data item and returning it to said user interface;

means for determining whether said first reference is to a location in said second database, and if so, for generating a second data query to the second database, requesting retrieval of said data item at said second database location;

means for determining whether said data item is stored at said second database location, and if so, for retrieving said data item and returning it to the user interface;

means for determining whether said second database includes a second reference for said data item to a location in said third database, and if so, for generating a third data query to the third database, requesting retrieval of said data item at said third database location;

means for determining whether said data item is stored at said third database location, and if so, for retrieving said data item and returning it to the user interface; and updating means for updating the first database's reference to the data item to include a reference to the location of the data item in the third database, if said data item was stored there.

5. The system of claim 4, wherein:

said updating means includes CallBack means for passing a CallBack procedure call to said first database and executing said CallBack procedure at said first database so as to update said first database's reference to the data item to include a reference to the location of the data item in the third database.

6. The system of claim 4 for retrieving data from a set of databases that includes at least one additional database, said retrieval means including means for querying a sequence of said databases to locate said data item until said data item is found in a last queried one of said databases;

said updating means including means for updating references for said data item in intermediate ones of databases, queried after said first database and before a next to last queried one of said databases, to include a reference to the data item in said last queried one of said databases.

* * * * *